(12) United States Patent
Landais et al.

(10) Patent No.: US 12,316,713 B2
(45) Date of Patent: May 27, 2025

(54) METHOD, APPARATUS AND COMPUTER PROGRAM

(71) Applicant: Nokia Technologies Oy, Espoo (FI)

(72) Inventors: Bruno Landais, Pleumeur-Bodou (FR); Narasimha Rao Pulipati, Redmond, WA (US); Saurabh Khare, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/365,705

(22) Filed: Aug. 4, 2023

(65) Prior Publication Data

US 2024/0048633 A1 Feb. 8, 2024

(30) Foreign Application Priority Data

Aug. 5, 2022 (GB) .................................... 2211468

(51) Int. Cl.
*G06F 15/173* (2006.01)
*H04L 67/51* (2022.01)

(52) U.S. Cl.
CPC .................................. *H04L 67/51* (2022.05)

(58) Field of Classification Search
CPC ... H04L 67/51; H04L 41/5058; H04L 41/122; H04L 67/52
See application file for complete search history.

(56) References Cited

U.S. PATENT DOCUMENTS

| 11,811,625 | B2* | 11/2023 | Lair ....................... H04L 67/52 |
| 2020/0127916 | A1 | 4/2020 | Krishan |
| 2020/0396132 | A1* | 12/2020 | Wang .................. H04L 41/0893 |
| 2023/0006895 | A1* | 1/2023 | Martinez de la Cruz .................. H04W 4/50 |

FOREIGN PATENT DOCUMENTS

WO 2021/110287 A1 6/2021

OTHER PUBLICATIONS

"3rd Generation Partnership Project; Technical Specification Group Core Network and Terminals; 5G System; Network Function Repository Services; Stage 3 (Release 17)", 3GPP TS 29.510, V17.6.0, Jun. 2022, pp. 1-306.
"3rd Generation Partnership Project; Technical Specification Group Services and System Aspects; System architecture for the 5G System (5GS); Stage 2 (Release 17)", 3GPP TS 23.501, V17.5.0, Jun. 2022, pp. 1-568.
"Locality Levels", 3GPP TSG-CT WG4 Meeting #102e, C4-211322, Ericsson, Feb. 23-Mar. 5, 2021, 28 pages.
(Continued)

*Primary Examiner* — John B Walsh
(74) *Attorney, Agent, or Firm* — SQUIRE PATTON BOGGS (US) LLP

(57) ABSTRACT

There is provided an apparatus comprising: means for providing, to a network repository function, a discovery request comprising a preferred locality query parameter, wherein the preferred locality query parameter comprises a plurality of location descriptions, and means for receiving, from the network repository function, a response to the discovery request, wherein the response comprises one or more service producers that match the preferred locality query parameter.

18 Claims, 12 Drawing Sheets

(56) References Cited

OTHER PUBLICATIONS

Search Report received for corresponding United Kingdom Patent Application No. 2211468.0, dated Jan. 26, 2023, 3 pages.
"Locality based NF Discovery enhancements", 3GPP TSG-CT WG4 Meeting #111-e, C4-224571, Nokia, Aug. 18-26, 2022, 72 pages.
Extended European Search Report received for corresponding European Patent Application No. 23189661.4, dated Oct. 11, 2023, 7 pages.

* cited by examiner

Figure 11

Providing, to a network repository function, a registration for a profile of the service producer, the profile comprising a locality attribute, wherein the locality attribute defines a plurality of location descriptions of the service producer    S1101

METHOD, APPARATUS AND COMPUTER PROGRAM

FIELD

The present application relates to a method, apparatus, and computer program for a wireless communication system.

BACKGROUND

A communication system may be a facility that enables communication sessions between two or more entities such as user terminals, base stations/access points and/or other nodes by providing carriers between the various entities involved in the communications path. A communication system may be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

SUMMARY

According to an aspect, there is provided an apparatus comprising: means for providing, to a network repository function, a discovery request comprising a preferred locality query parameter, wherein the preferred locality query parameter comprises a plurality of location descriptions; and means for receiving, from the network repository function, a response to the discovery request, wherein the response comprises one or more service producers that match the preferred locality query parameter.

In an example, the apparatus is for a service consumer. In an example, the apparatus is comprised within a service consumer. In an example, the apparatus is a service consumer.

In an example, the locality query parameter is a preferred-locality query parameter.

In an example, the locality query parameter indicates a preference to discover candidate NF service producers that are located at the preferred locality.

In an example, the plurality of location descriptions are a plurality of different location descriptions.

In an example, the response comprises one or more service producers that match at least one of the plurality of location descriptions within the locality query parameter.

In an example, each of the plurality of location descriptions is associated with a priority value indicating the relative priority, for the service consumer, of each location description among the plurality of location descriptions.

In an example, each of the plurality of location descriptions have an associated type of location description.

In an example, each of the plurality of location descriptions have at least one of: an associated location level, and a granularity level.

In an example, two or more of the plurality of location descriptions are associated with different types of location description.

In an example, an ordering of the plurality of location descriptions within the preferred locality query parameter indicates a priority level for each of the location descriptions.

In an example, the preferred locality query parameter is configured as a map of key-value pairs, wherein, for each key-value pair: the key indicates a priority value, and the value indicates at least one type of location description and a related location description value.

In an example, the apparatus comprises: means for, in response to receiving the response, communicating with the one or more service producers.

In an example, the apparatus comprises: means for, in response to receiving the response, using the received one or more service producers that match the preferred locality query parameter and the associated priority of each of the plurality of location descriptions to prioritise a service producer of the one or more service producers, to communicate with.

In an example, each of the plurality of location descriptions within the preferred locality query parameter is associated with an abstract indicator, which enables a correlation of each location description registered in network function profiles with location descriptions provided in the discovery request with the same abstract indicator.

According to an aspect, there is provided an apparatus comprising: means for receiving, from a service consumer, a discovery request comprising a preferred locality query parameter, wherein the preferred locality query parameter comprises a plurality of location descriptions; means for determining one or more service producers for the service consumer using the plurality of location descriptions comprised within the received discovery request; and means for providing, to the service consumer, a response to the discovery request, wherein the response comprises one or more service producers that match the preferred locality query parameter.

In an example, the apparatus is for a network repository function. In an example, the apparatus is comprised within a network repository function. In an example, the apparatus is a network repository function.

In an example, each of the plurality of location descriptions of the preferred locality query parameter is associated with a priority value indicating the relative priority, for the service consumer, of each location description among the plurality of location descriptions.

In an example, the apparatus comprises: means for receiving, from a service producer, a request for a registration for a profile of the service producer, the profile comprising a locality attribute, wherein the locality attribute defines a plurality of location descriptions of the service producer.

In an example, each of the plurality of location descriptions of the service producer have a different associated type of location description.

In an example, each of the plurality of location descriptions of the preferred locality query parameter have an associated type of location description.

In an example, each of the plurality of location descriptions of the preferred locality query parameter have at least one of: an associated location level and a granularity level.

In an example, two or more of the plurality of location descriptions of the preferred locality query parameter are associated with different types of location description.

In an example, an ordering of the plurality of location descriptions within the preferred locality query parameter indicates a priority level for each of the location descriptions.

In an example, the preferred locality query parameter is configured as a map of key-value pairs, wherein, for each key-value pair: the key indicates a priority value, and the value indicates at least one type of location description and a related location description value.

In an example, each of the plurality of location descriptions within the preferred locality query parameter is associated with an abstract indicator, which enables a correlation of each location description registered in network function profiles with location descriptions provided in the discovery request with the same abstract indicator.

In an example, the means for determining one or more service producers comprises: means for, for service producers matching at least one location description of the preferred locality query parameter of the discovery request, determining a service producer matching a location description with a highest priority level in the discovery request, and subsequently, determining a service producer matching a location description with a next priority level in the discovery request In an example, the network repository function determines that a service producer matches one location description of the preferred locality query parameter when the locality parameter registered in the profile of that service producer contains at least one location description matching said one location description of the preferred locality query parameter.

In an example, one location description matches said one location description of the preferred locality query parameter when they have the same type of location, or abstract indicator value, and the same location description value.

In an example, the apparatus comprises: means for assigning a priority value for each candidate service producer provided to the service consumer in the response, based on the priority associated with the matching location description of the preferred locality query parameter.

In an example, the apparatus comprises: means for replacing the type of location description of each of the plurality of location descriptions with other values determined by an operator.

In an example, the apparatus comprises: means for replacing the type of location description of each of the plurality of location descriptions with abstract levels of location granularity.

According to an aspect, there is provided an apparatus comprising: means for providing, to a network repository function, a registration for a profile of the service producer, the profile comprising a locality attribute, wherein the locality attribute defines a plurality of location descriptions of the service producer.

In an example, the apparatus is for a service producer. In an example, the apparatus is comprised within a service producer. In an example, the apparatus is a service producer.

In an example, the profile is a network function profile.

In an example, each of the plurality of location descriptions of the service producer have a different associated type of location description.

In an example, the locality attribute is configured as a map of key-value pairs, wherein, for each key-value pair, the key indicates a type of location description, and the value indicates a location description value.

In an example, the locality attribute is configured as a map of key-value pairs, wherein, for each key-value pair, the key indicates an abstract indicator value, and the value indicates a location description value.

In an example, the apparatus comprises: means for receiving, from the network repository function, a response message indicating a successful registration of the profile of the service producer at the network repository function.

In an example, the type of location indicates at least one of: data center, state, canton, region, province, county, district, city.

According to an aspect, there is provided a method for a service consumer, the method comprising: providing, to a network repository function, a discovery request comprising a preferred locality query parameter, wherein the preferred locality query parameter comprises a plurality of location descriptions; and receiving, from the network repository function, a response to the discovery request, wherein the response comprises one or more service producers that match the preferred locality query parameter.

In an example, the locality query parameter is a preferred-locality query parameter.

In an example, the locality query parameter indicates a preference to discover candidate NF service producers that are located at the preferred locality.

In an example, the plurality of location descriptions are a plurality of different location descriptions.

In an example, the response comprises one or more service producers that match at least one of the plurality of location descriptions within the locality query parameter.

In an example, each of the plurality of location descriptions is associated with a priority value indicating the relative priority, for the service consumer, of each location description among the plurality of location descriptions.

In an example, each of the plurality of location descriptions have an associated type of location description.

In an example, each of the plurality of location descriptions have at least one of: an associated location level, and a granularity level.

In an example, two or more of the plurality of location descriptions are associated with different types of location description.

In an example, an ordering of the plurality of location descriptions within the preferred locality query parameter indicates a priority level for each of the location descriptions.

In an example, the preferred locality query parameter is configured as a map of key-value pairs, wherein, for each key-value pair, the key indicates a priority value, and the value indicates one or more types of location description and the related location description value.

In an example, the method comprises: in response to receiving the response, communicating with the one or more service producers.

In an example, the method comprises: in response to receiving the response, using the received one or more service producers that match the preferred locality query parameter and the associated priority of each of the plurality of location descriptions to prioritise a service producer of the one or more service producers, to communicate with.

In an example, each of the plurality of location descriptions within the preferred locality query parameter is associated with an abstract indicator, which enables a correlation of each location description registered in network function profiles with location descriptions provided in the discovery request with the same abstract indicator.

According to an aspect, there is provided a method for a network repository function, the method comprising: receiving, from a service consumer, a discovery request comprising a preferred locality query parameter, wherein the preferred locality query parameter comprises a plurality of location descriptions; determining one or more service producers for the service consumer using the plurality of location descriptions comprised within the received discovery request; and providing, to the service consumer, a response to the discovery request, wherein the response comprises one or more service producers that match the preferred locality query parameter.

In an example, each of the plurality of location descriptions of the preferred locality query parameter is associated with a priority value indicating the relative priority, for the service consumer, of each location description among the plurality of location descriptions.

In an example, the method comprises: receiving, from a service producer, a request for a registration for a profile of the service producer, the profile comprising a locality attribute, wherein the locality attribute defines a plurality of location descriptions of the service producer.

In an example, each of the plurality of location descriptions of the service producer have a different associated type of location description.

In an example, each of the plurality of location descriptions of the preferred locality query parameter have an associated type of location description.

In an example, each of the plurality of location descriptions of the preferred locality query parameter have at least one of: an associated location level and a granularity level.

In an example, two or more of the plurality of location descriptions of the preferred locality query parameter are associated with different types of location description.

In an example, an ordering of the plurality of location descriptions within the preferred locality query parameter indicates a priority level for each of the location descriptions.

In an example, the preferred locality query parameter is configured as a map of key-value pairs, wherein, for each key-value pair, the key indicates a type of location description, and the value indicates a location description value.

In an example, each of the plurality of location descriptions within the preferred locality query parameter is associated with an abstract indicator, which enables a correlation of each location description registered in network function profiles with location descriptions provided in In an example, the determining one or more service producers comprises: for service producers matching at least one location description of the preferred locality query parameter of the discovery request, determining a service producer matching a location description with a highest priority level in the discovery request, and subsequently, determining a service producer matching a location description with a next priority level in the discovery request In an example, the network repository function determines that a service producer matches one location description of the preferred locality query parameter when the locality parameter registered in the profile of that service producer contains at least one location description matching said one location description of the preferred locality query parameter.

In an example, one location description matches said one location description of the preferred locality query parameter when they have the same type of location, or abstract indicator value, and the same location description value.

In an example, the method comprises: assigning a priority value for each candidate service producer provided to the service consumer in the response, based on the priority associated with the matching location description of the preferred locality query parameter.

In an example, the method comprises: replacing the type of location description of each of the plurality of location descriptions with other values determined by an operator.

In an example, the method comprises: replacing the type of location description of each of the plurality of location descriptions with abstract levels of location granularity.

According to an aspect, there is provided a method for a service producer, the method comprising: providing, to a network repository function, a registration for a profile of the service producer, the profile comprising a locality attribute, wherein the locality attribute defines a plurality of location descriptions of the service producer.

In an example, the profile is a network function profile.

In an example, each of the plurality of location descriptions of the service producer have a different associated type of location description.

In an example, the locality attribute is configured as a map of key-value pairs, wherein, for each key-value pair, the key indicates a type of location description, and the value indicates a location description value.

In an example, the locality attribute is configured as a map of key-value pairs, wherein, for each key-value pair, the key indicates an abstract indicator value, and the value indicates a location description value.

In an example, the method comprises: receiving, from the network repository function, a response message indicating a successful registration of the profile of the service producer at the network repository function.

In an example, the type of location indicates at least one of: data center, state, canton, region, province, county, district, city.

According to an aspect, there is provided an apparatus comprising: at least one processor, and at least one memory storing instructions that, when executed by the one or more processors, cause the apparatus to perform: providing, to a network repository function, a discovery request comprising a preferred locality query parameter, wherein the preferred locality query parameter comprises a plurality of location descriptions; and receiving, from the network repository function, a response to the discovery request, wherein the response comprises one or more service producers that match the preferred locality query parameter.

In an example, the locality query parameter is a preferred-locality query parameter.

In an example, the locality query parameter indicates a preference to discover candidate NF service producers that are located at the preferred locality.

In an example, the plurality of location descriptions are a plurality of different location descriptions.

In an example, the response comprises one or more service producers that match at least one of the plurality of location descriptions within the locality query parameter.

In an example, each of the plurality of location descriptions is associated with a priority value indicating the relative priority, for the service consumer, of each location description among the plurality of location descriptions.

In an example, each of the plurality of location descriptions have an associated type of location description.

In an example, each of the plurality of location descriptions have at least one of: an associated location level, and a granularity level.

In an example, two or more of the plurality of location descriptions are associated with different types of location description.

In an example, an ordering of the plurality of location descriptions within the preferred locality query parameter indicates a priority level for each of the location descriptions.

In an example, the preferred locality query parameter is configured as a map of key-value pairs, wherein, for each key-value pair, the key indicates a priority value, and the value indicates one or more types of location description and the related location description value.

In an example, the method comprises: in response to receiving the response, communicating with the one or more service producers.

In an example, the apparatus is caused to perform: in response to receiving the response, using the received one or more service producers that match the preferred locality query parameter and the associated priority of each of the plurality of location descriptions to prioritise a service producer of the one or more service producers, to communicate with.

In an example, each of the plurality of location descriptions within the preferred locality query parameter is associated with an abstract indicator, which enables a correlation of each location description registered in network function profiles with location descriptions provided in the discovery request with the same abstract indicator.

According to an aspect, there is provided an apparatus comprising: at least one processor, and at least one memory storing instructions that, when executed by the one or more processors, cause the apparatus to perform: receiving, from a service consumer, a discovery request comprising a preferred locality query parameter, wherein the preferred locality query parameter comprises a plurality of location descriptions; determining one or more service producers for the service consumer using the plurality of location descriptions comprised within the received discovery request; and providing, to the service consumer, a response to the discovery request, wherein the response comprises one or more service producers that match the preferred locality query parameter.

In an example, each of the plurality of location descriptions of the preferred locality query parameter is associated with a priority value indicating the relative priority, for the service consumer, of each location description among the plurality of location descriptions.

In an example, the apparatus is caused to perform: receiving, from a service producer, a request for a registration for a profile of the service producer, the profile comprising a locality attribute, wherein the locality attribute defines a plurality of location descriptions of the service producer.

In an example, each of the plurality of location descriptions of the service producer have a different associated type of location description.

In an example, each of the plurality of location descriptions of the preferred locality query parameter have an associated type of location description.

In an example, each of the plurality of location descriptions of the preferred locality query parameter have at least one of: an associated location level and a granularity level.

In an example, two or more of the plurality of location descriptions of the preferred locality query parameter are associated with different types of location description.

In an example, an ordering of the plurality of location descriptions within the preferred locality query parameter indicates a priority level for each of the location descriptions.

In an example, the preferred locality query parameter is configured as a map of key-value pairs, wherein, for each key-value pair, the key indicates a type of location description, and the value indicates a location description value.

In an example, each of the plurality of location descriptions within the preferred locality query parameter is associated with an abstract indicator, which enables a correlation of each location description registered in network function profiles with location descriptions provided in In an example, the determining one or more service producers comprises: for service producers matching at least one location description of the preferred locality query parameter of the discovery request, determining a service producer matching a location description with a highest priority level in the discovery request, and subsequently, determining a service producer matching a location description with a next priority level in the discovery request In an example, the network repository function determines that a service producer matches one location description of the preferred locality query parameter when the locality parameter registered in the profile of that service producer contains at least one location description matching said one location description of the preferred locality query parameter.

In an example, one location description matches said one location description of the preferred locality query parameter when they have the same type of location, or abstract indicator value, and the same location description value.

In an example, the apparatus is caused to perform: assigning a priority value for each candidate service producer provided to the service consumer in the response, based on the priority associated with the matching location description of the preferred locality query parameter.

In an example, the apparatus is caused to perform: replacing the type of location description of each of the plurality of location descriptions with other values determined by an operator.

In an example, the apparatus is caused to perform: replacing the type of location description of each of the plurality of location descriptions with abstract levels of location granularity.

According to an aspect, there is provided an apparatus comprising: at least one processor, and at least one memory storing instructions that, when executed by the one or more processors, cause the apparatus to perform: providing, to a network repository function, a registration for a profile of the service producer, the profile comprising a locality attribute, wherein the locality attribute defines a plurality of location descriptions of the service producer.

In an example, the profile is a network function profile.

In an example, each of the plurality of location descriptions of the service producer have a different associated type of location description.

In an example, the locality attribute is configured as a map of key-value pairs, wherein, for each key-value pair, the key indicates a type of location description, and the value indicates a location description value.

In an example, the locality attribute is configured as a map of key-value pairs, wherein, for each key-value pair, the key indicates an abstract indicator value, and the value indicates a location description value.

In an example, the apparatus is caused to perform: receiving, from the network repository function, a response message indicating a successful registration of the profile of the service producer at the network repository function.

In an example, the type of location indicates at least one of: data center, state, canton, region, province, county, district, city.

According to an aspect, there is provided a computer program comprising instructions, which when executed by an apparatus, cause the apparatus to perform: providing, to a network repository function, a discovery request comprising a preferred locality query parameter, wherein the preferred locality query parameter comprises a plurality of location descriptions; and receiving, from the network repository function, a response to the discovery request, wherein the response comprises one or more service producers that match the preferred locality query parameter.

According to an aspect, there is provided a computer program comprising instructions, which when executed by an apparatus, cause the apparatus to perform: receiving, from a service consumer, a discovery request comprising a preferred locality query parameter, wherein the preferred locality query parameter comprises a plurality of location descriptions; determining one or more service producers for the service consumer using the plurality of location descriptions comprised within the received discovery request; and providing, to the service consumer, a response to the discovery request, wherein the response comprises one or more service producers that match the preferred locality query parameter.

According to an aspect, there is provided a computer program comprising instructions, which when executed by an apparatus, cause the apparatus to perform: providing, to a network repository function, a registration for a profile of the service producer, the profile comprising a locality attribute, wherein the locality attribute defines a plurality of location descriptions of the service producer.

According to an aspect, there is provided a non-transitory computer readable medium comprising program instructions that, when executed by an apparatus, cause the apparatus to perform: providing, to a network repository function, a discovery request comprising a preferred locality query parameter, wherein the preferred locality query parameter comprises a plurality of location descriptions; and receiving, from the network repository function, a response to the discovery request, wherein the response comprises one or more service producers that match the preferred locality query parameter.

According to an aspect, there is provided a non-transitory computer readable medium comprising program instructions that, when executed by an apparatus, cause the apparatus to perform: receiving, from a service consumer, a discovery request comprising a preferred locality query parameter, wherein the preferred locality query parameter comprises a plurality of location descriptions; determining one or more service producers for the service consumer using the plurality of location descriptions comprised within the received discovery request; and providing, to the service consumer, a response to the discovery request, wherein the response comprises one or more service producers that match the preferred locality query parameter.

According to an aspect, there is provided a non-transitory computer readable medium comprising program instructions that, when executed by an apparatus, cause the apparatus to perform: providing, to a network repository function, a registration for a profile of the service producer, the profile comprising a locality attribute, wherein the locality attribute defines a plurality of location descriptions of the service producer.

A computer product stored on a medium may cause an apparatus to perform the methods as described herein.

A non-transitory computer readable medium comprising program instructions, that, when executed by an apparatus, cause the apparatus to perform the methods as described herein.

An electronic device may comprise apparatus as described herein.

In the above, various aspects have been described. It should be appreciated that further aspects may be provided by the combination of any two or more of the various aspects described above.

Various other aspects and further embodiments are also described in the following detailed description and in the attached claims.

According to some aspects, there is provided the subject matter of the independent claims. Some further aspects are defined in the dependent claims. The embodiments that do not fall under the scope of the claims are to be interpreted as examples useful for understanding the disclosure.

LIST OF ABBREVIATIONS

AF: Application Function
AMF: Access Management Function
AN: Access Network
API: Application Programming Interface
BS: Base Station
CN: Core Network
DL: Downlink
eNB: eNodeB
gNB: gNodeB
IIoT: Industrial Internet of Things
LTE: Long Term Evolution
NEF: Network Exposure Function
NG-RAN: Next Generation Radio Access Network
NF: Network Function
NFc: Network Function service consumer
NFp: Network Function service producer
NR: New Radio
NRF: Network Repository Function
NW: Network
MS: Mobile Station
PCF Policy Control Function
PLMN: Public Land Mobile Network
RAN: Radio Access Network
RF: Radio Frequency
SBA: Service Based Architecture
SCP: Service Communication Proxies
SMF: Session Management Function
UE: User Equipment
UDR: Unified Data Repository
UDM: Unified Data Management
UL: Uplink
UPF: User Plane Function
3GPP: $3^{rd}$ Generation Partnership Project
5G: $5^{th}$ Generation
5GC: 5G Core network
5G-AN: 5G Radio Access Network
5GS: 5G System

DESCRIPTION OF FIGURES

Embodiments will now be described, by way of example only, with reference to the accompanying Figures in which:

FIG. 11 shows an example method flow diagram performed by a service producer.

DETAILED DESCRIPTION

Before explaining in detail some examples of the present disclosure, certain general principles of a wireless communication system and mobile communication devices are briefly explained with reference to FIGS. 1 to 3 to assist in understanding the technology underlying the described examples.

Figure 1:
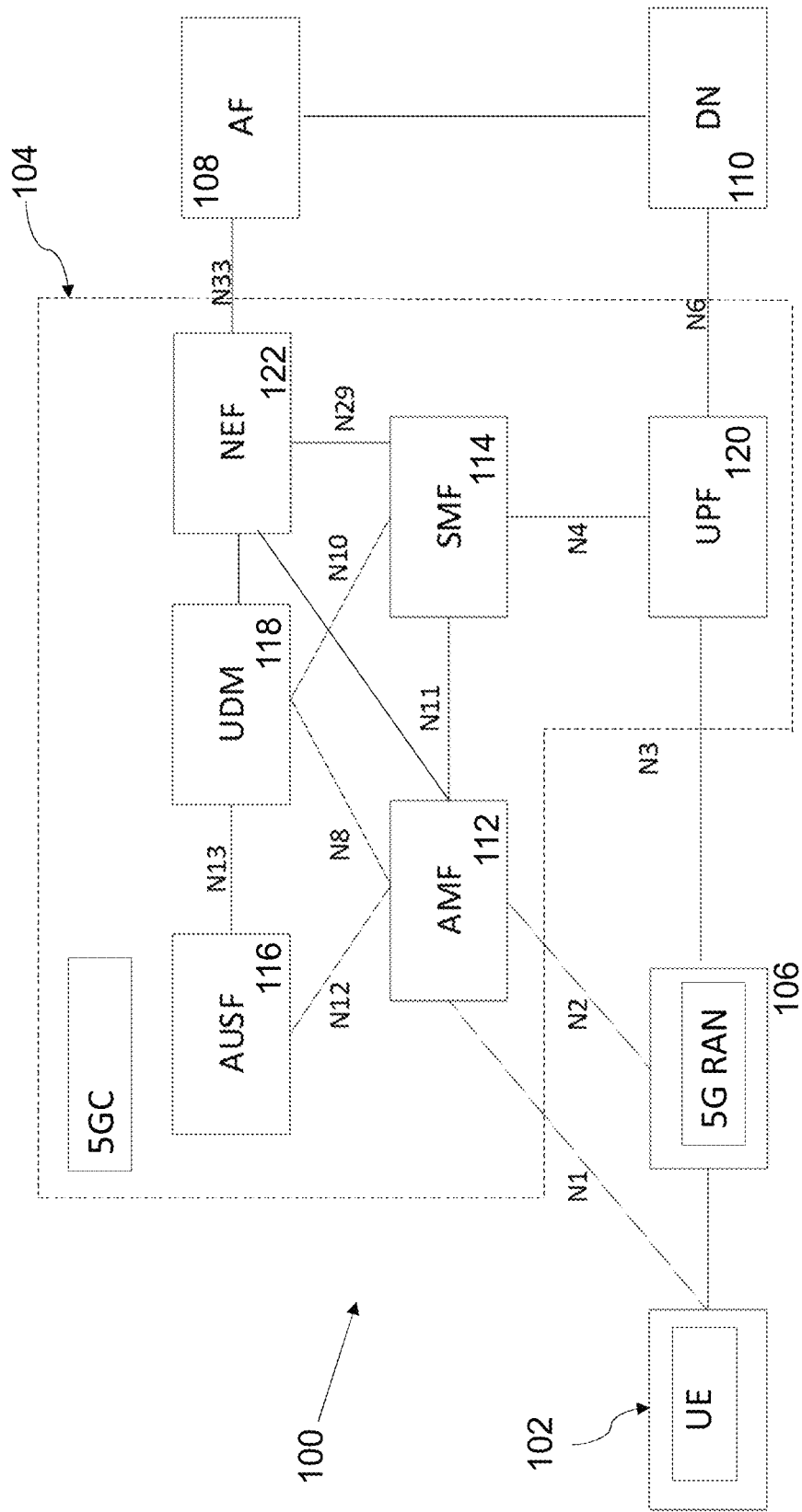
FIG. 1 shows a schematic representation of a 5G system.

In a wireless communication system 100, such as that shown in FIG. 1, mobile communication devices/terminals or user apparatuses, and/or user equipments (UE), and/or machine-type communication devices 102 are provided wireless access via at least one base station (not shown) or similar wireless transmitting and/or receiving node or point. A communication device is provided with an appropriate signal receiving and transmitting apparatus for enabling communications, for example enabling access to a communication network or communications directly with other devices. The communication device may access a carrier provided by a station or access point, and transmit and/or receive communications on the carrier.

In the following certain examples are explained with reference to mobile communication devices capable of communication via a wireless cellular system and mobile communication systems serving such mobile communication devices. Before explaining in detail the examples of disclose, certain general principles of a wireless communication system, access systems thereof, and mobile communication devices are briefly explained with reference to FIGS. 1, 2 and 3 to assist in understanding the technology underlying the described examples.

FIG. 1 shows a schematic representation of a 5G system (5GS) 100. The 5GS may comprises a device 102 such as user equipment or terminal, a 5G access network (5G-AN) 106, a 5G core network (5GC) 104, one or more network functions (NF), one or more application function (AF) 108 and one or more data networks (DN) 110.

The 5G-AN 106 may comprise one or more gNodeB (gNB) distributed unit functions connected to one or more gNodeB (gNB) centralized unit functions.

The 5GC 104 may comprise an access management function (AMF) 112, a session management function (SMF) 114, an authentication server function (AUSF) 116, a user data management (UDM) 118, a user plane function (UPF) 120, a network exposure function (NEF) 122 and/or other NFs. Some of the examples as shown below may be applicable to 3GPP 5G standards. However, some examples may also be applicable to 4G, 3G and other 3GPP standards.

In a communication system, such as that shown in FIG. 1, mobile communication devices/terminals or user apparatuses, and/or user equipments (UE), and/or machine-type communication devices are provided with wireless access via at least one base station or similar wireless transmitting and/or receiving node or point. The terminal is provided with an appropriate signal receiving and transmitting apparatus for enabling communications, for example enabling access to a communication network or communications directly with other devices. The communication device may access a carrier provided by a station or access point, and transmit and/or receive communications on the carrier.

Figure 2:
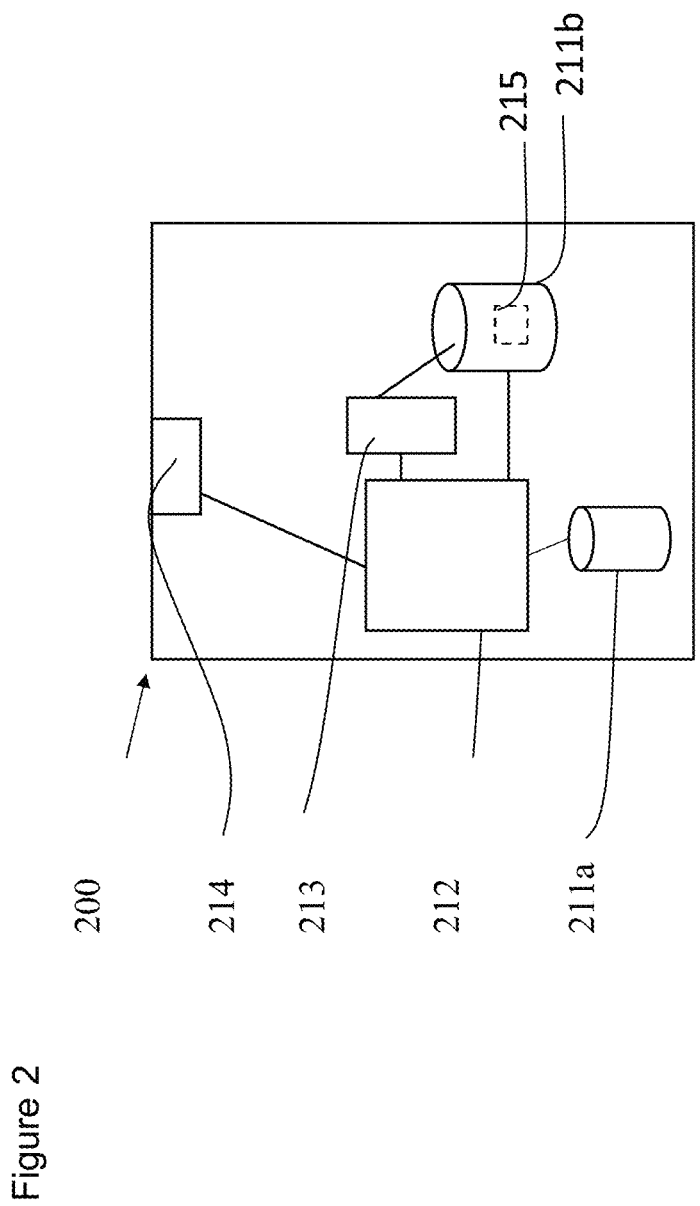
FIG. 2 shows a schematic representation of a control apparatus.

FIG. 2 illustrates an example of a control apparatus 200 for controlling a function of the 5G-AN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5G-AN or the 5GC. In some examples, each function of the 5G-AN or the 5GC comprises a control apparatus 200. In alternative examples, two or more functions of the 5G-AN or the 5GC may share a control apparatus.

Figure 3:
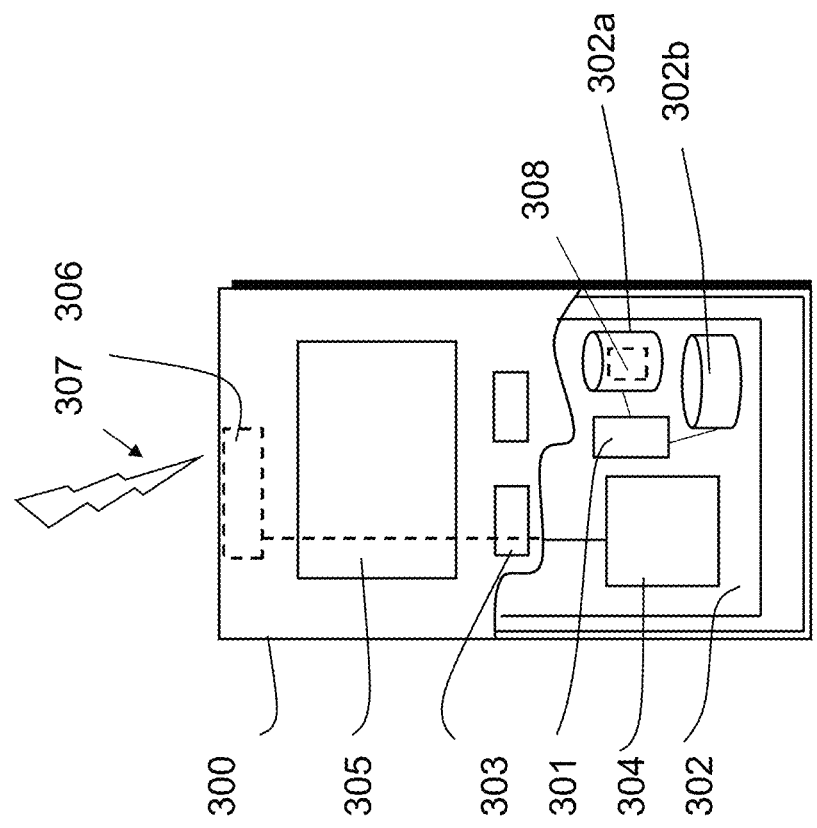
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302a and the ROM 302a. The at least one processor 301 may be configured to execute an appropriate software code 308. The software code 308 may for example allow to perform one or more of the present aspects. The software code 308 may be stored in the ROM 302a.

The processor, storage and other relevant control apparatus may be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

Figure 4:
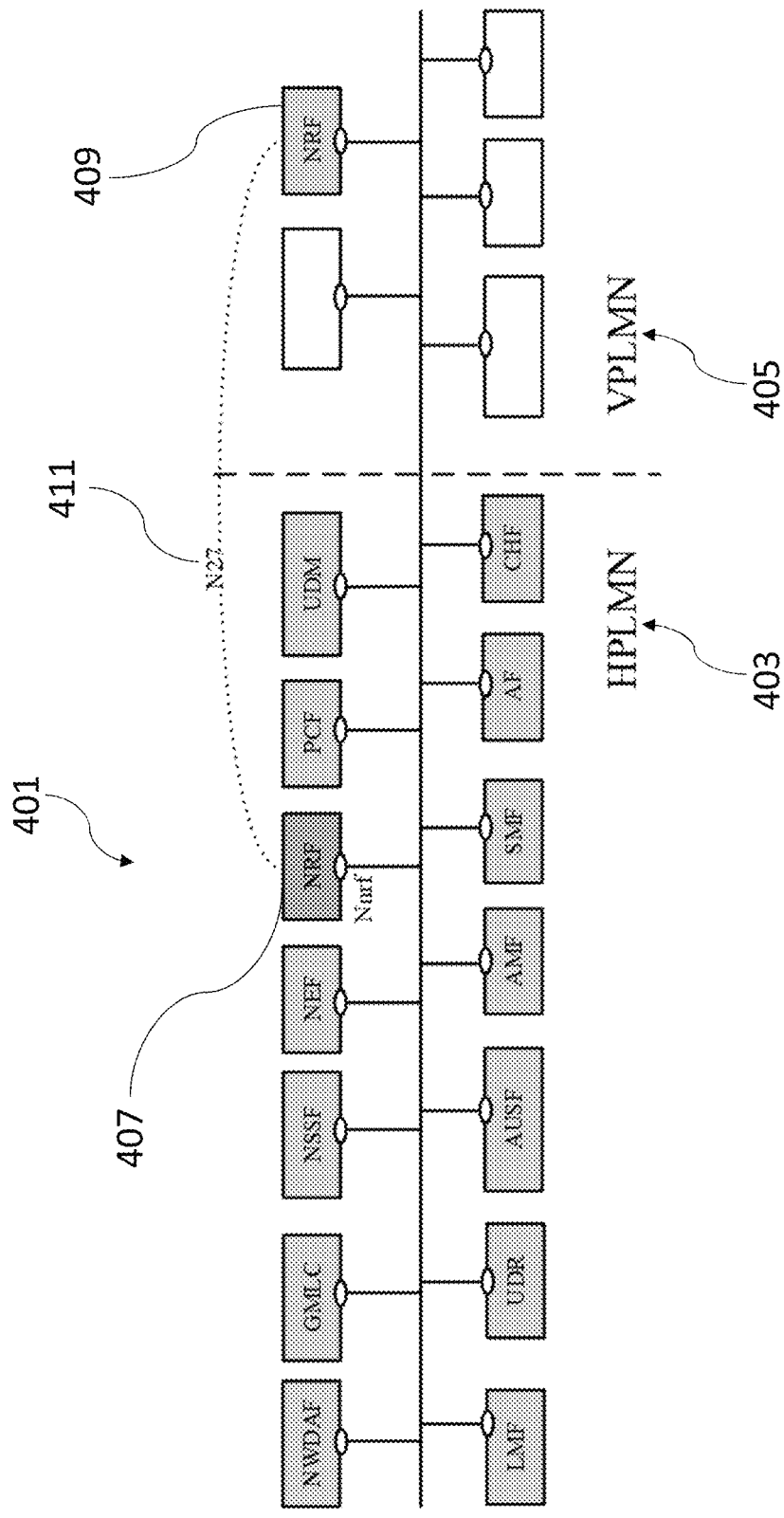
FIG. 4 shows a schematic representation of a service based architecture.

The 5G Core network (5GC) has been defined as a service based architecture (SBA), with network function (NF) service producers exposing services to NF service consumers. This is shown in FIG. 4, as described below. NF service producers register their NF profile in a network repository function (NRF). The NF profile may contain NF level specific information, and a list of NF service instances supported by the NF with their associated attributes.

FIG. 4 shows a schematic representation of a service based architecture.

The system 401 comprises a home public land mobile network (HPLMN) 403 and a visited public land mobile network (VPLMN) 405. Each of the HPLMN 403 and the VPLMN 405 comprise a plurality of NFs. Many of the network functions are shown in FIG. 1, as previously described.

One of the NFs of the HPLMN 403 is an NRF 407. The VPLMN 405 also comprises an NRF 409. The NRF 407 of the HPLMN 403 is able to communicate with the NRF 409 of the VPLMN 405 via an N27 link 411. Other NFs of the HPLMN 403 and the VPLMN 405 are also able to communicate through a variety of other links (not shown).

NF Service consumers including service communication proxies (SCP) in indirect communications can discover NF service producers by performing an NF Discovery procedure towards the NRF 407, 409 with query parameters describing the services or properties of the NF service producers they wish to discover. The NRF 407, 409 returns the NF profiles of candidate NF service producers matching the query parameters in the response. An NF Discovery response will sometimes contain NF profiles of multiple candidate producers. This is shown in FIG. 5.

Figure 5:
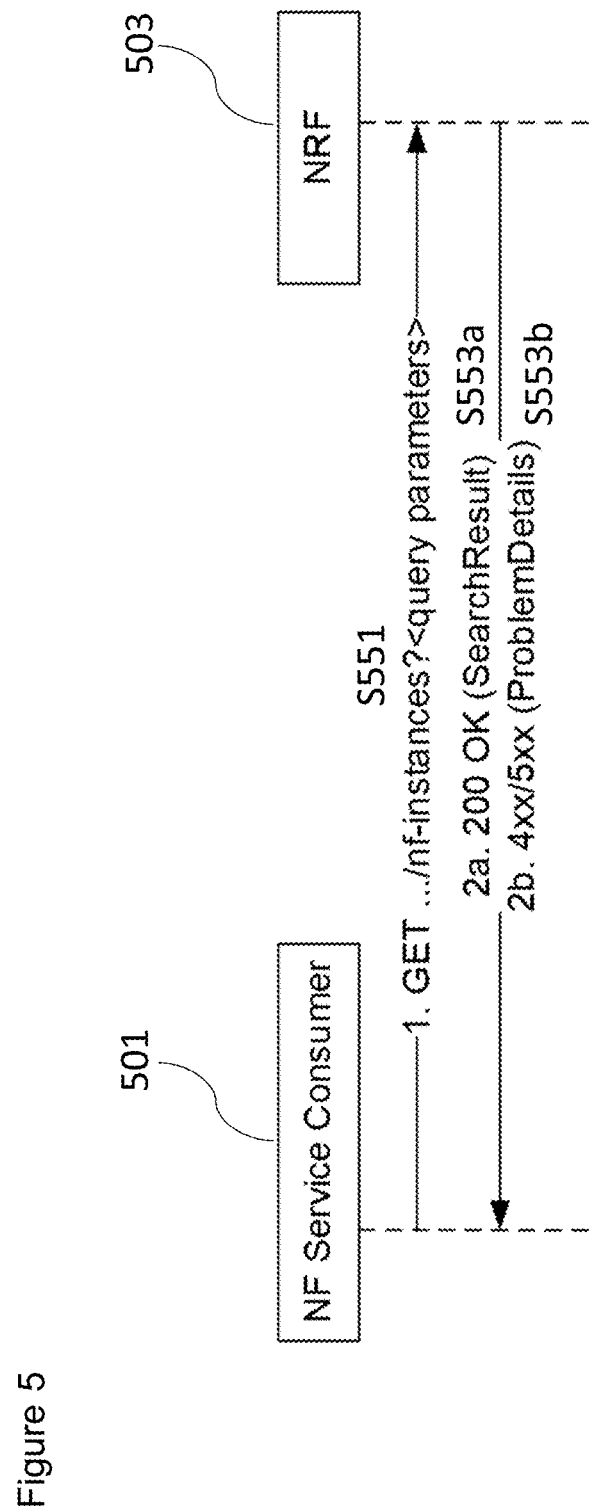
FIG. 5 shows an example signalling diagram for a network function discovery procedure.

FIG. 5 shows an example signalling diagram for a network function discovery procedure. The communications are between an NF service consumer 501 and an NRF 503.

In S551, the NF service consumer 501 provides an NF discovery request to the NRF 503. The request comprises query parameters. The request may be encoded as an HTTP "GET . . . /nf-instances?<query parameters>" method.

In S553a, the NRF 503 provides a (positive) response to the NF discovery request to the NF service consumer 501 with at least one matching NF profile. The at least one matching NF profile matches the query parameters of the request. The response message may be in the format of "200 OK (Search Result)".

In S553b, the NRF 503 provides a (negative) response to the NF discovery request to the NF service consumer 501. The response may be negative due to, for example, missing mandatory information in the request. The format of the response message may be in the format of "4xx/5xx (Problem details)".

An NF service producer (NFp) may register, in particular, in its NF profile, a locality attribute. A locality attribute may contain an operator defined information about the location of the NF instance. For example, location information may comprise geographic location, a data center, etc. Attributes that may be included in an NF profile are shown in Table 1 below. The 'locality attribute' is highlighted in bold.

TABLE 1

| Definition of type NF Profile | | | | |
|---|---|---|---|---|
| Attribute name | Data type | P | Cardinality | Description |
| nfInstanceId | NfInstanceId | M | 1 | Unique identity of the NF Instance. |
| nfType | NFType | M | 1 | Type of Network Function |
| nfStatus | NFStatus | M | 1 | Status of the NF Instance (NOTE 5) (NOTE 16) |
| collocatedNfInstances | array(Collocated NfInstance) | O | 1 . . . N | Information related to collocated NF type(s) and corresponding NF Instances when the NF is collocated with NFs supporting other NF types. (NOTE 21) In this release of the specification, following collocation scenarios are supported (see clause 6.1.6.2.99): a MB-SMF collocated with a SMF; a MB-UPF collocated with a UPF. |
| nfInstanceName | string | O | 0 . . . 1 | Human readable name of the NF Instance |
| . . . | | | | |
| priority | integer | O | 0 . . . 1 | Priority (relative to other NFs of the same type) within the range 0 to 65535, to be used for NF selection; lower values indicate a higher priority. Priority may or may not be present in the nfServiceList parameters, xxxInfo parameters and in this attribute. Priority in the nfServiceList has precedence over the priority in this attribute (NOTE 4). Priority in xxxInfo parameter shall only be used to determine the relative priority among NF instances with the same priority at NFProfile/NFService. The NRF may overwrite the received priority value when exposing an NFProfile with the Nnrf_NFDiscovery service. |

TABLE 1-continued

Definition of type NF Profile

| Attribute name | Data type | P | Cardinality | Description |
|---|---|---|---|---|
| capacity | integer | O | 0 . . . 1 | Static capacity information within the range 0 to 65535, expressed as a weight relative to other NF instances of the same type; if capacity is also present in the nfServiceList parameters, those will have precedence over this value. (NOTE 4). |
| load | integer | O | 0 . . . 1 | Dynamic load information, within the range 0 to 100, indicates the current load percentage of the NF. |
| locality | string | O | 0 . . . 1 | Operator defined information about the location of the NF instance (e.g. geographic location, data center) (NOTE 3) |

NOTE 3:
A requester NF may use this information to select a NF instance (e.g. a NF instance preferably located in the same data center).

An NF service consumer (NFc), or SCP, may include in an NF discovery request a 'preferred-locality' query parameter that indicates a preference to discover candidate NFps that are located at the 'preferred-locality'. Table 2, below, shows query parameters that may be included in discovery requests. If included in the discovery request, the NRF will try to determine candidate NFps that match the 'preferred-locality' indicated by the NFc. Said another way, the NRF will determine NFps that have registered the locality attribute in their profile with the same value as the value received in the 'preferred-locality' query parameter. If the NRF does not determine NFps that match the 'preferred-locality' query parameter, the NRF returns other candidate NFps matching other query parameters included the NF discovery request.

preferred locality comprising multiple location descriptions. For example, a request for one or more data centers, cities, regions, and their respective precedence orders/priorities. For example, an NFc prefers to find a NFp in 'data center 123' as a first priority, otherwise in 'data center 456', then in Los Angeles, then in California, in decreasing order of preference.

The NRF 'NFManagement' API does not support registering different granularities of location information. The API only allows different granularities when concatenating all location granularities info in a single string with an operator/vendor specific interpretation of the string. In this context, a granularity is a level of detail. For example, a first level of granularity may be a data center, a second level

TABLE 2

URI query parameters supported by the 'GET' method

| Name | Data type | Cardinality | Description | Applicability |
|---|---|---|---|---|
| target-nf-type | NFType | M 1 | This IE shall contain the NF type of the target NF being discovered. | |
| . . . | . . . | . . . . . . | . . . | |
| preferred-locality | string | O 0 . . . 1 | Preferred target NF location (e.g. geographic location, data center). When present, the NRF shall prefer NF profiles with a locality attribute that matches the preferred-locality. The NRF may return additional NFs in the response not matching the preferred target NF location, e.g. if no NF profile is found matching the preferred target NF location. The NRF should set a lower priority for any additional NFs on the response not matching the preferred target NF location than those matching the preferred target NF location. In addition, based on operator's policy, the NRF may set different priorities based on the localities of the NFs. (NOTE 6) | |

NOTE 6:
The SMF may select the P-CSCF close to the UPF by setting the preferred-locality to the value of the locality of the UPF.

It has been identified that the NRF 'NFDiscovery' application programming interface (API) does not enable an NFc (or SCP) to perform an NF discovery request indicating multiple preferences for the location of the NFp and/or a being a city, and a third level being a state/area, and so on. Furthermore, the NRF 'NFManagement' and 'NFDiscovery' APIs do not allow the NRF (and NFc/SCP) to know the type of location information registered by NFp or queried by NFc/SCP in the NF profile. The type of location information may include, for example, a data center, a city, a region, etc.

The lack of support discussed above limits the possibility for the NFc to discover NFps that best match the preference of the NFc. This also limits the possibility for the NRF to prioritise candidate NF profiles based on the respective location of candidate NFps and the preferences expressed by the NFc. Furthermore, this limits an NFc to perform a similar prioritisation based on the NF profiles that have been discovered by the NRF. The NRF, NFc and SCP may check whether the NFp's locality string matches, but not the preferred-locality of the NFc.

In other systems, it has been proposed to extend the attributes included in an NF profile, to include a further attribute. The further attribute comprises an array of strings which expresses preferences comprising multiple locality descriptions and their relative precedence/priority. The NFp can register different locality information in order, from a higher to a lower priority. However, an NFp can know its location information, but priorities are subject to what the NFc performing the NF discovery request desires. Furthermore, this proposal does not enable an indication to differentiate a type of location information that is registered, nor to know whether the location information registered by different NFps are of the same type or not.

One or more of the following examples aim to address one or more of the problems discussed above.

In examples, an NFc performs an NF discovery procedure in which they indicate a preferred locality for candidate NFps comprising multiple location descriptions. The multiple location descriptions may be of the same or different type/granularity. In some examples, a precedence/priority may be provided for each location description in the request. This will be described in more detail below.

In examples, an NFp registers its locality in its NF profile with multiple location descriptions. The multiple location descriptions may have the same or different granularity levels. This will be described in more detail below.

In examples, the NRF prioritizes candidate NFps to return in an NF discovery response based on the priorities/preferences expressed by the NFc and the multiple location descriptions, registered in the NFp profile. This will be described in more detail below.

In examples, the NFc prioritizes candidate NFps to use to serve a new request, based on the priorities/preferences from the NFc for the new request to serve, and the multiple location descriptions in the NFp profiles discovered and cached earlier. This will be described in more detail below.

In examples, each location description registered by the NFp in its NF profile or expressed by the NFc/SCP within the preferred-locality parameter is associated with the type of location information. The type of location information may be, for example, a data center, a city, a province, a state, etc. This will be described in more detail below.

In examples, each location description registered by the NFp in its NF profile or expressed by the NFc/SCP within the preferred-locality parameter is associated with an abstract indicator. The abstract indicator is chosen by an operator. This enables an NRF to correlate/match each location description registered in NFp profiles with location description provided in NF discovery requests with the same abstract indicator. In some examples, the NRF is not aware of the type of location registered in the NFp profile or queried by the NFc (or SCP). This will be described in more detail below.

In examples, the abstract indicator may be defined as an abstract level of location granularity. This enables an NRF to distinguish different levels of location granularity from the finest level of location to the widest level of location. Each operator may map its own choices of types of locations to each abstract level of location granularity. In some examples, the NRF is unaware of the type of location registered in the NFp profile or queried by the NFc or SCP. Instead, the NRF may use the abstract level of location granularity for a look-up of candidate NFps that best match the preferred-locality expressed by the NFc. This will be described in more detail below.

Figure 6:
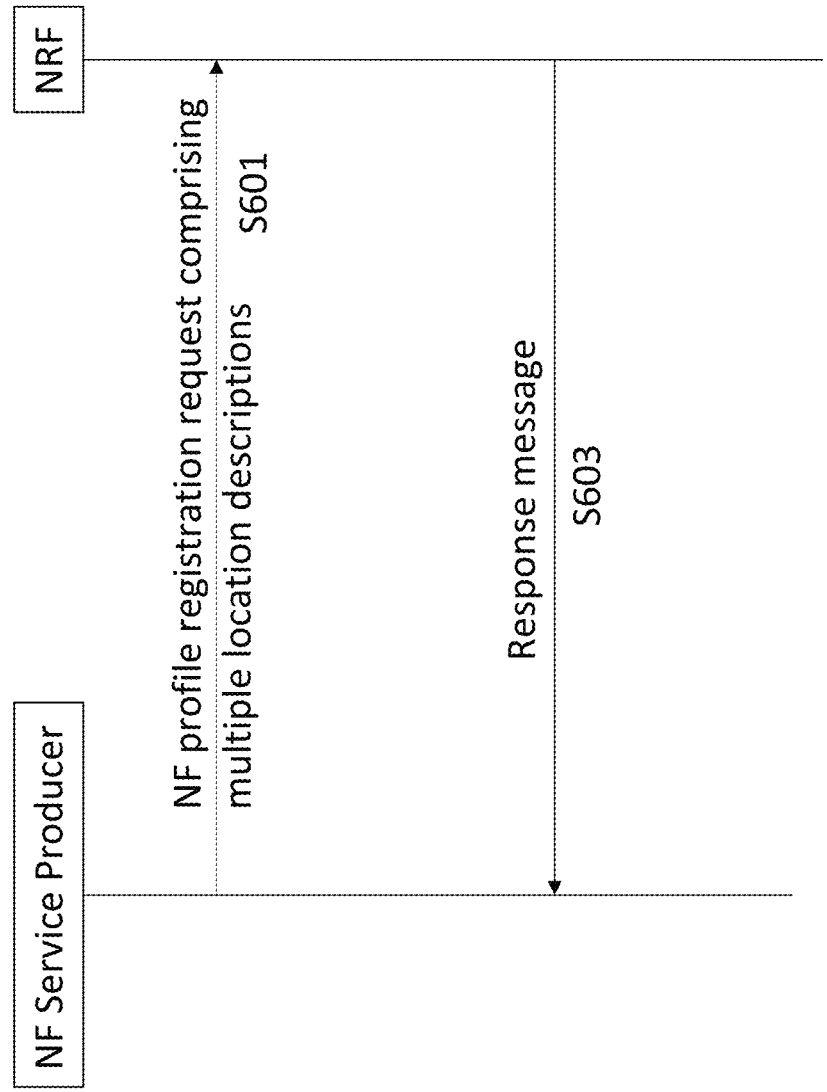
FIG. 6 shows an example signalling diagram between a network function service producer and a network repository function.

FIG. 6 shows an example signalling diagram between a network function service producer and a network repository function. During a registration procedure, an NFp is able to register multiple location descriptions of the NFp in an NF profile of the NFp. In some examples, the multiple location descriptions may be associated with a related type of location. In some examples, the multiple location descriptions may be associated with an abstract indicator chosen by the operator.

In S601, a network function service producer (NFp) provides a registration request to a network repository function (NRF). The registration request is to a register an NF profile for the NFp. For the 'locality' attribute in the registration request, the attribute comprises multiple location descriptions that are associated with the NFp. Each of the multiple location descriptions may be associated with a type of location, and/or an abstract indicator and/or a location granularity level.

In some examples, a locality attribute is defined in the NF Profile as a map of key-value pairs. In this case, the key may indicate a type of location (e.g. city). The value may indicate the location value (e.g. Los Angeles). Alternatively, for a map of key-value pairs, for each key-value pair, the key (of the key-value pair) indicates a priority value, and the value (of the key-value pair) indicates at least one type of location description and a related location description.

In S603, the NRF provides a response message to the NFp. The response message may indicate a successful registration of the NF profile for the NFp. Alternatively, the response message may indicate an error.

Some examples of locality attribute in NF profile following registration are as follows:

```
NF profile #1:
   "locality": {"datacenter123", "Los Angeles", "California"}
NF profile #2:
   "locality": {
      "data center": "datacenter123",
      "city": "Los Angeles",
      "state": "California"}
NF profile #3:
   "locality": {
      "data center": "datacenter456",
      "city": "San Francisco",
      "state": "California"}
```

In the above examples, the first NF profile includes three location descriptions of the NFp. For the second and third NF profiles, there are three location descriptions of the respective NFp as well as associated types of the location descriptions. It is noted that the first and second NF profiles are for the same NFp, wherein the second NF profile additionally includes information as to the type of location description.

Figure 7:
FIG. 7 shows an example signalling diagram between a network function service consumer and a network repository function.

FIG. 7 shows an example signalling diagram between a network function service consumer and a network repository function. In this example, some of the steps are performed by a network function service consumer. In other examples, the steps performed by the network function service consumer are instead performed by an SCP.

In S701, a network function service consumer (NFc) provides a discovery request to a network repository function (NRF). The request comprises multiple location descriptions. The multiple location descriptions are used to identify NF profiles that the NFc prefers to use.

In examples, the request comprises a 'preferred-locality' query parameter. The 'preferred-locality' query parameter is a 'new' query parameter which comprise the multiple location descriptions. The multiple location descriptions may be of the same and/or different types/granularity levels. For example, a first request may comprise only the type 'city' location descriptions, "Los Angeles, San Francisco". A second request may comprise different types of location descriptions, "Los Angeles, Datacentre456".

The multiple location descriptions may be provided with a relative priority/precedence. In other examples, the ordering of the multiple location descriptions within the request may indicate a priority (i.e. implicit priority). For example, the first location description in the list has the highest priority. Alternatively, the first location description in the list has the lowest priority. In this case, the query parameter is encoded as an ordered list of location descriptions.

Each of the multiple location description may associated with its type of location and/or with an abstract indicator and/or with a location granularity level.

In some examples, the preferred-locality query parameter is defined as a map of key-value pairs. In this case, the key of each key-value pair indicates a type of location. For example, one of a: data center, state, canton, region, province, county, district, city, etc.). The value of each key-value pair may encode: one location value, a list of location values. Each value in the key-value pair may also comprise an associated precedence/priority of that location value.

Some examples of the preferred-locality query parameter, which is included in a discovery request to the NRF:

{"datacenter-123", "Los Angeles", "California" }
{datacenter: datacenter-123, city: Los Angeles, state: California}

These indicate a preference to discover an NFp in the datacenter "datacenter-123", or in the city of Los Angeles, or in the state of "California").

{datacenter: {datacenter-123, datacenter-456}, city: Los Angeles, state: California}

This indicates a preference to discover an NFp in the datacenter "datacenter-123" or "datacenter-456", or in the city of Los Angeles, or in the state of "California").

{datacenter: {datacenter-123, priority 1}, city: {Los Angeles, priority 2}, state: {California, priority 3}

This indicates a preference to discover an NFp in the datacenter "datacenter-123", otherwise in the city of Los Angeles, otherwise in the state of "California").

As previously described, the priority of each location description may be implicit and derived from the ordering of the location descriptions in the query parameter. For example, starting from the highest priority location description to the lowest priority location description.

[{datacenter: datacenter-123}, {city: Los Angeles}, {state: California}]

This indicates a preference to discover an NFp in the datacenter "datacenter-123", otherwise in the city of Los Angeles, otherwise in the state of "California").

[{datacenter: datacenter-123}, {datacenter: datacenter-789}, {city: Los Angeles}, {state: California})

This indicates a preference to discover an NFp in the datacenter "datacenter-123", otherwise in the datacenter "datacenter-789", otherwise in the city of Los Angeles, otherwise in the state of "California").

In some examples, there may be an encoding of the locality query parameter, where the priority/precedence is encoded as a map key "1", "2", "3", etc, wherein each map value encodes one or more location type (or abstract indicator) and location value:

preferred-locality={"1": [{datacenter: dc-123}], "2": [{city: Los Angeles}, {city: San Diego}], "3": [{state: California}]}

This indicates a preference to discover an NFp in the datacenter "dc-123", otherwise in the city of Los Angeles or San Diego, otherwise in the state of "California.

In S703, the NRF receives the discovery request from the NFc. Upon receiving the discovery Request, the NRF looks for an NFp (NF profile) matching the 'preferred-locality' query parameter of the NFc. The NRF may attempt to find an NFp matching the highest priority location description first. If the NRF does not determine an NFp matching the highest priority of the request, the NRF may perform the determination for the next priority location description, until the lowest priority location description has been determined.

In S705, the NRF provides candidate NF profiles that match the parameters of the request from the NFc. The provision may be in response to the completion of the determination in S703. In some examples, the NRF provides one or more candidate NF profiles to the NFc. In other examples, if there are no matching NF profiles (i.e. if query parameters, other than parameters expressing a preference such as preferred-locality parameter, cannot be met by any NFp profile), the NRF will inform the NFc that there are no suitable candidates.

It should be understood that the name of the query parameter as "preferred-location" is given as an example only. Any suitable name may be used for this query parameter.

In some examples, instead of a type of location being provided with each location description, a value is chosen by an operator as an abstract (or discrete) indicator. In this context, being chosen by the operator means that the operator configures at least one of: the NFc, NFp, and the NRF. The operator may configure the NRF, when specific operator policies should be used at the NRF dependent on abstract indicators, with the abstract indicator to use together with a location description.

Examples of possible encodings of the preferred-locality query parameter:

{abc: datacenter-123, defg: Los Angeles, wxyz: California}
{abc: {datacenter-123, datacenter-456}, defg: Los Angeles, wxyz: California}
{abc: {datacenter-123, priority 1}, defg: {Los Angeles, priority 2}, wxyz: {California, priority 3}

In some examples, there is an encoding of the locality query parameter, where the priority/precedence is encoded as a map key "1", "2", "3", etc, wherein each map value encodes one or more abstract indicators and location value:

preferred-locality={"1": [{abc: dc-123}], "2": [{defg: Los Angeles}, {defg: San Diego}], "3": [{wyyz: California}]}

This indicates a preference to discover an NFp in the datacenter "dc-123", otherwise in the city of Los Angeles or San Diego, otherwise in the state of "California.

An example of a locality attribute in an NF profile:

"locality": {
   "abc": "datacenter123",
   "defg": "Los Angeles",
   "wxyz": "California"}

In some other examples, the abstract/discrete indicator is defined as a level of location granularity. The definition of a level (or levels) of granularity enables an NRF to distinguish different levels of location granularity from a finest level of location description to a widest level of location. A set number of levels may be configured. The NRF itself may determine a number of levels of configure. In other examples, the NRF may be provided with such a configuration. For example, a finest level may be "level 1", a wider level may be "level 2", and a widest level may be "level 3".

Some examples of possible encodings of the 'preferred-locality' query parameter are as follows:
  {level1: datacenter-123, level2: Los Angeles, level3: California}
  {level1: {datacenter-123, datacenter-456}, level2: Los Angeles, level3: California}
  {level1: {datacenter-123, priority 1}, level2: {Los Angeles, priority 2}, level3: {California, priority 3}}
An example of locality attribute in NF profile:
  "locality": {"level1": "datacenter123", "level2": "Los Angeles", "level3": "California" }

These examples, with definitions of levels, provides a generic framework abstracting and hierarchizing multiple location granularities. This enables the NRF to prioritize the candidate NFps matching the finest location granularity (i.e. level1). Otherwise, the NRF matches the next level of location granularity (i.e. level2) and so on, until the widest location granularity (e.g. "level3"). This keeps the NRF (and NFc) logic simple and generic. It may be determined by each operator how many levels to define/encode. It may be determined by each operator which type of location information they wish to encode in each level.

In some examples, a 'preferred-locality' parameter is defined that can give multiple locality values with their respective priorities. In these examples, there is no requirement to change the configuration of NF profiles at the NRF.

In these examples, the preferred-locality parameter has multiple locality values, with their respective priorities.

For a first example, the 'preferred-locality' query parameter may be:
  preferred-locality={"1": "local site 1", "2": "remote site 1", "3": "remote site 2" }

In the first example above, "1", "2" and "3" correspond to the first, second and third preferences. This indicates a discovery request for an NFp that is in "local site 1" as a first priority, if none exists, then "remote site 1", and if none exists, then "remote site 2".

For a second example:
  preferred-locality={"1": "local site 1", "2": {"remote site 1", "remote site 2" }, "3": "remote site 3}

In the second example above, "1", "2" and "3" correspond to the first, second and third preferences. "Local site 1" has the first (top) priority. "Remote site 1" and "remote site 2" have the same priority. "Remote site 3" has the lowest priority. The same principle also applies to other query parameters in the discovery request.

Figure 8:
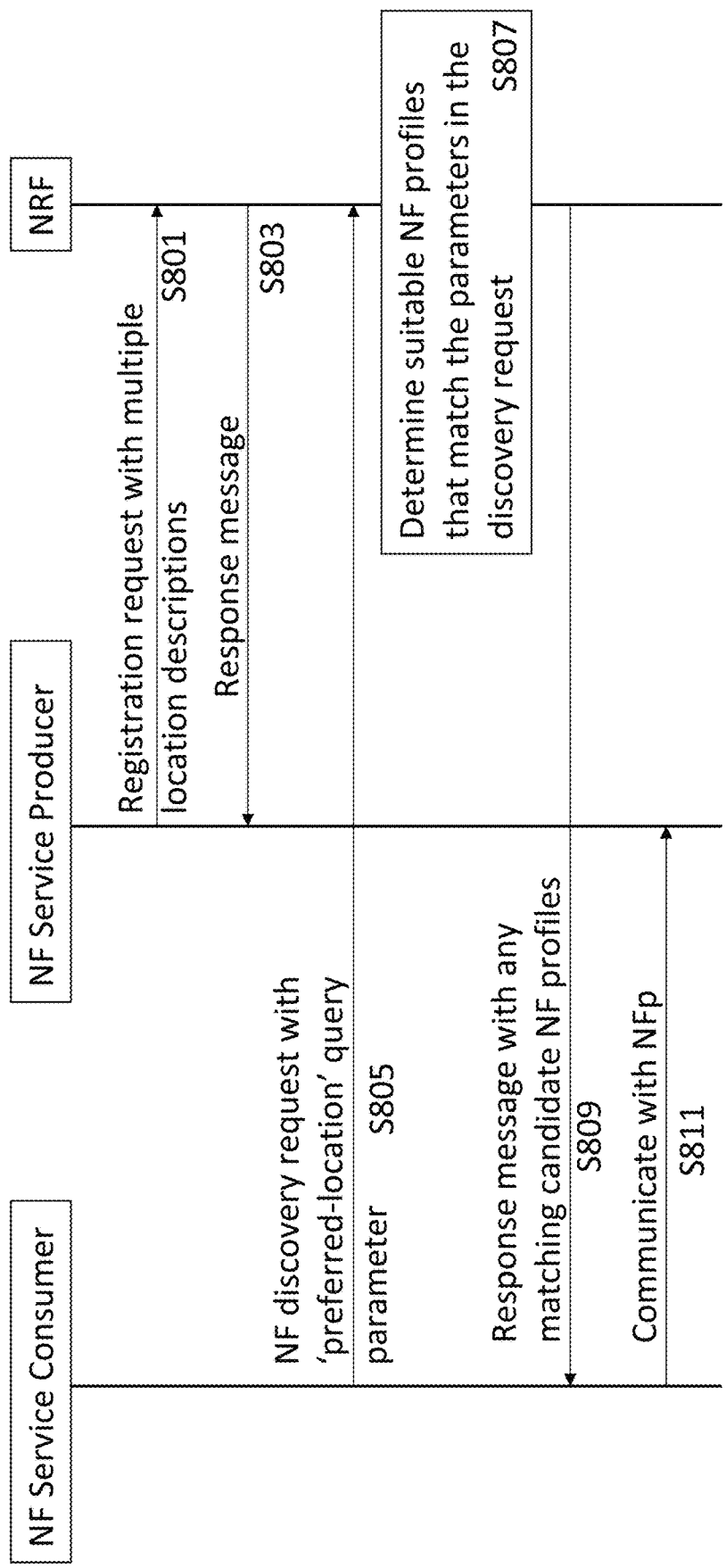
FIG. 8 shows an example signalling diagram between a network function service producer, a network function service consumer, and a network repository function.

FIG. 8 shows an example signalling diagram between a network function service producer, a network function service consumer, and a network repository function. In this example, some of the steps are performed by a network function service consumer. In other examples, the steps performed by the network function service consumer are instead performed by an SCP.

In S801, a network function service producer (NFp) provides a registration request to a network repository function (NRF). For the 'locality' attribute in the registration request, the attribute comprises multiple location descriptions that are associated with the NFp. In this example, each of the multiple location descriptions is associated with a type of location.

For the example of FIG. 8, the registration request (S801) includes "locality": {"data center": "datacenter2323", "city": "Boston", "state": "Massachusetts"}

In S803, the NRF provides a response message to the NFp indicating a successful registration of the NF profile for the NFp.

In S805, an NFc provides a discovery request message to the NRF. The request comprises multiple location descriptions. The request comprises a 'preferred-locality' query parameter. In this example, a request comprises [[datacenter: datacenter-1919], [city: Boston], [state: Massachusetts]]. In this example, it is assumed that the ordering of the location descriptions in the request indicate a priority level, such that "datacenter-1919" is the highest priority, and "Massachusetts" is the lowest priority.

In S805, the NRF receives the discovery request from the NFc. Upon receiving the discovery Request, the NRF looks for an NFp (NF profile) matching the 'preferred-locality' query parameter of the NFc.

Firstly, the NRF determines whether there is an NF profile matching the highest priority location description of "datacenter-1919", from the request (S805). In this example, it is assumed that this determination is false.

Secondly, the NRF determines whether there is an NF profile matching the second priority location description of "Boston", from the request (S805). The NF profile saved at the NRF from the registration request of S801 matches the "Boston" location description of type "City". In this example, it is assumed that this is the only NF profile (saved at the NRF) that matches the "City" type.

In S809, in response to the determining, the NRF provides the NF profile associated with the NFp that matches the parameters of the request from the NFc.

In S811, in response to receiving the message from the NRF (S809), the NFc communicates with the NFp.

It should be appreciated that the examples used in FIG. 8 are shown to aid understanding. In other examples, any suitable location information may be registered at the NRF, and any suitable information may be provided in the discovery request.

One or more of the examples described above enables an NF consumer to perform a discovery request with a plurality of different location descriptions, whereby each of the location descriptions may include a priority. An advantage of this is that the NF consumer is provided with an improved list of candidate NF profiles that are suitable for the NF consumer. This removes limitations on the NF consumer to find NF producers that best match the preferences of the NF consumer, in terms of location. Furthermore, with examples described above, this enables the NF producers and NRFs to be able to provide this improved service for the NF consumers. The NRFs and/or NF consumers do not need to rely on operator specific interpretations of the existing 'locality' attribute string (of Table 1).

Figure 9:
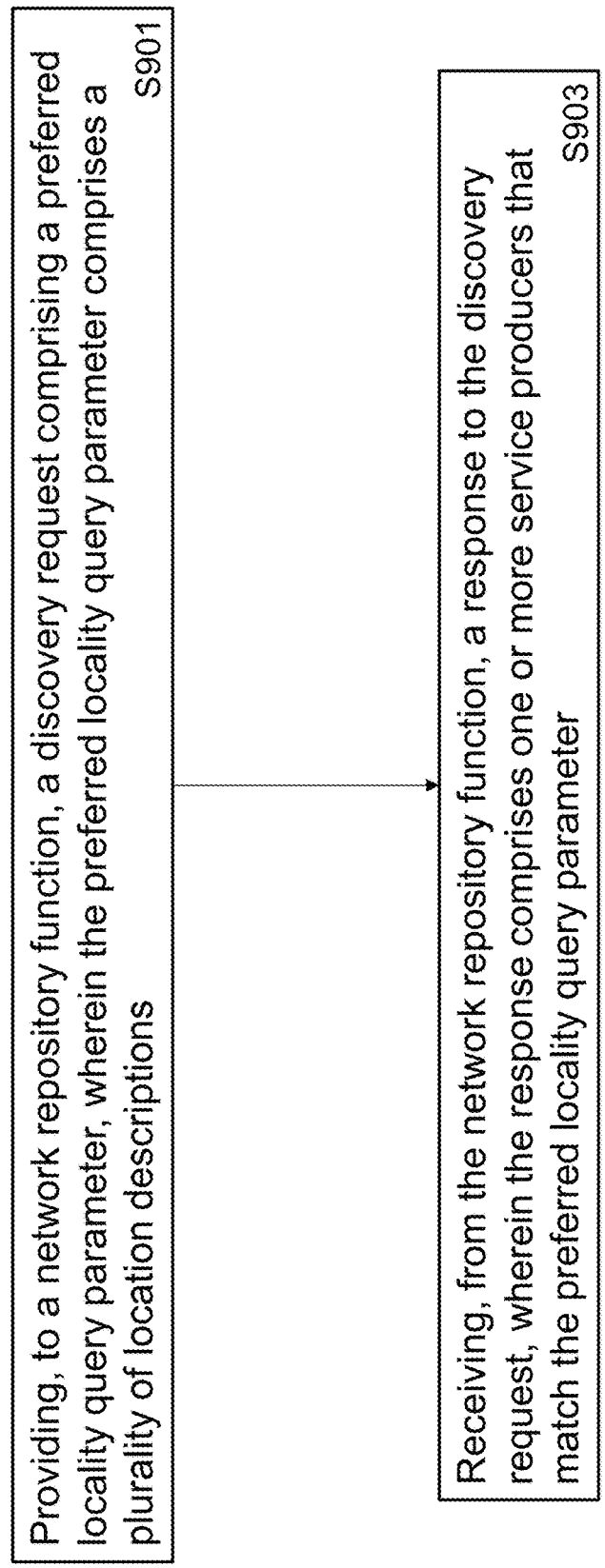
FIG. 9 shows an example method flow diagram performed by a service consumer.

FIG. 9 shows an example method flow performed by an apparatus. The apparatus may be comprised within a network function. In an example, the network function may be a service consumer.

In S901, the method comprises providing, to a network repository function, a discovery request comprising a preferred locality query parameter, wherein the preferred locality query parameter comprises a plurality of location descriptions.

Figure 10:
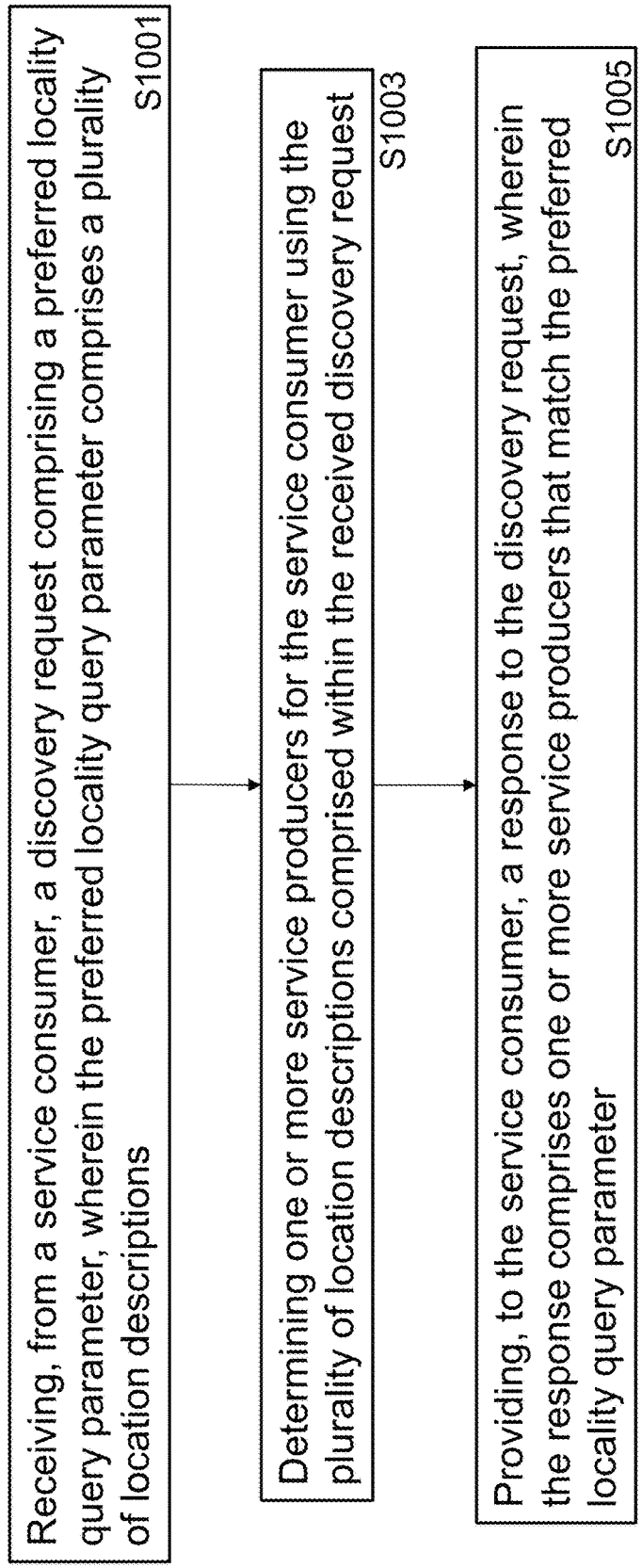
FIG. 10 shows an example method flow diagram performed by a network repository function.

In S903, the method comprises receiving, from the network repository function, a response to the discovery request, wherein the response comprises one or more service producers that match the preferred locality query parameter FIG. 10 shows an example method flow performed by an apparatus. The apparatus may be comprised within a network function. In an example, the network function is an NRF.

In S1001, the method comprises receiving, from a service consumer, a discovery request comprising a preferred locality query parameter, wherein the preferred locality query parameter comprises a plurality of location descriptions.

In S1003, the method comprises determining one or more service producers for the service consumer using the plurality of location descriptions comprised within the received discovery request.

In S1005, the method comprises providing, to the service consumer, a response to the discovery request, wherein the response comprises one or more service producers that match the preferred locality query parameter.

FIG. 11 shows an example method flow performed by an apparatus. The apparatus may be comprised within a network function. In an example, the network function is a service producer.

In S1101, the method comprises providing, to a network repository function, a registration for a profile of the service producer, the profile comprising a locality attribute, wherein the locality attribute defines a plurality of location descriptions of the service producer.

Figure 12:
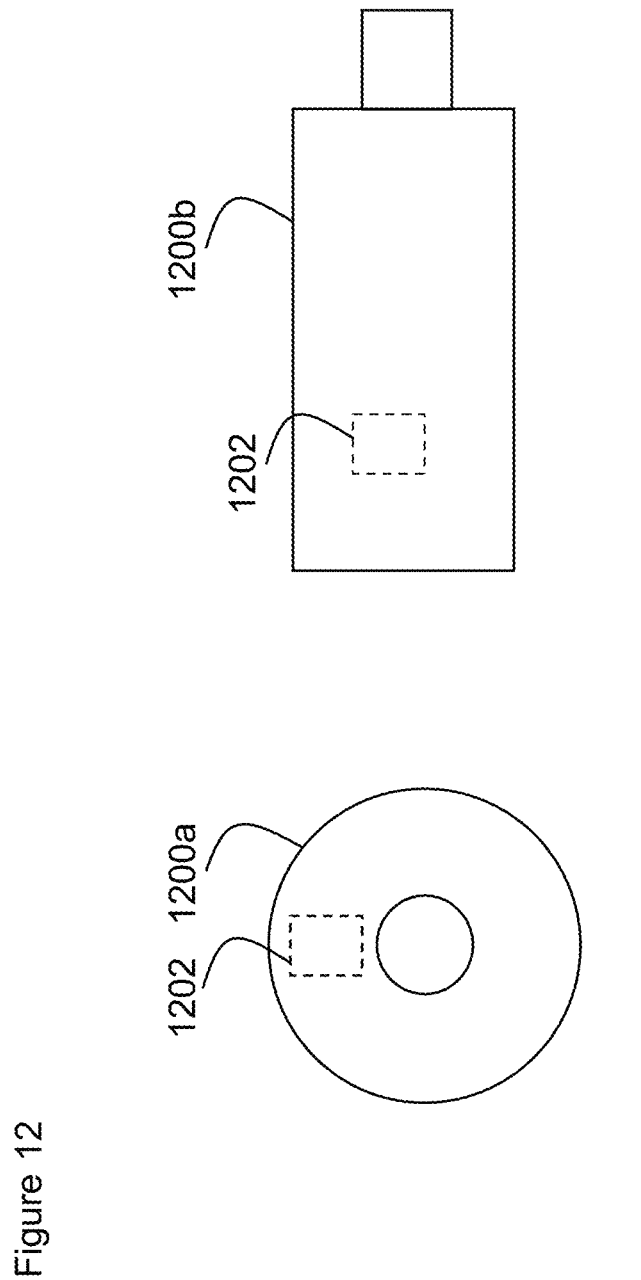
FIG. 12 shows a schematic representation of a non-volatile memory medium storing instructions which when executed by a processor allow a processor to perform one or more of the steps of the method of FIGS. 9 to 11.

FIG. 12 shows a schematic representation of non-volatile memory media 1200a (e.g. computer disc (CD) or digital versatile disc (DVD)) and 1200b (e.g. universal serial bus (USB) memory stick) storing instructions and/or parameters 1202 which when executed by a processor allow the processor to perform one or more of the steps of the methods of FIGS. 9 to 11.

It is noted that while the above describes example embodiments, there are several variations and modifications which may be made to the disclosed solution without departing from the scope of the present invention.

The examples may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The term "non-transitory", as used herein, is a limitation of the medium itself (i.e. tangible, not a signal) as opposed to a limitation on data storage persistency (e.g. RAM vs ROM).

As used herein, "at least one of the following: <a list of two or more elements>" and "at least one of: <a list of two or more elements>" and similar wording, where the list of two or more elements are joined by "and", or "or", mean at least any one of the elements, or at least any two or more of the elements, or at least all of the elements.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples.

Alternatively, or additionally some examples may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
  (a) hardware-only circuit implementations (such as implementations in only analogue and/or digital circuitry);
  (b) combinations of hardware circuits and software, such as:
    (i) a combination of analogue and/or digital hardware circuit(s) with software/firmware and
    (ii) any portions of hardware processor(s) with software (including digital signal processor(s)), software, and memory(ies) that work together to cause an apparatus, such as the communications device or base station to perform the various functions previously described; and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

ANNEX

1. An apparatus for a service consumer, the apparatus comprising:
   means for providing, to a network repository function, a discovery request comprising a preferred locality query parameter, wherein the preferred locality query parameter comprises a plurality of location descriptions; and
   means for receiving, from the network repository function, a response to the discovery request, wherein the response comprises one or more service producers that match the preferred locality query parameter.
2. The apparatus according to statement 1, wherein each of the plurality of location descriptions is associated with a priority value indicating the relative priority, for the service consumer, of each location description among the plurality of location descriptions.
3. The apparatus according to statement 1 or statement 2, wherein each of the plurality of location descriptions have an associated type of location description.
4. The apparatus according to statement 1 or statement 2, wherein each of the plurality of location descriptions have at least one of: an associated location level, and a granularity level.
5. The apparatus according to statement 3, wherein two or more of the plurality of location descriptions are associated with different types of location description.
6. The apparatus according to any of statements 1 to 5, wherein an ordering of the plurality of location descriptions within the preferred locality query parameter indicates a priority level for each of the location descriptions.
7. The apparatus according to any of statements 1 to 6, wherein the preferred locality query parameter is configured as a map of key-value pairs, wherein, for each key-value pair:
   the key indicates a priority value, and
   the value indicates at least one type of location description and a related location description value.
8. The apparatus according to any of statements 1 to 7, wherein the apparatus comprises:
   means for, in response to receiving the response, communicating with the one or more service producers.
9. The apparatus according to statement 5 or statement 6, wherein the apparatus comprises:
   means for, in response to receiving the response, using the received one or more service producers that match the preferred locality query parameter and the associated priority of each of the plurality of location descriptions to prioritise a service producer of the one or more service producers, to communicate with.
10. The apparatus according to any of statements 1 to 9, wherein each of the plurality of location descriptions within the preferred locality query parameter is associated with an abstract indicator, which enables a correlation of each location description registered in network function profiles with location descriptions provided in the discovery request with the same abstract indicator.
11. An apparatus for a network repository function, the apparatus comprising:
    means for receiving, from a service consumer, a discovery request comprising a preferred locality query parameter, wherein the preferred locality query parameter comprises a plurality of location descriptions;
    means for determining one or more service producers for the service consumer using the plurality of location descriptions comprised within the received discovery request; and
    means for providing, to the service consumer, a response to the discovery request, wherein the response comprises one or more service producers that match the preferred locality query parameter.
12. The apparatus according to statement 11, wherein each of the plurality of location descriptions of the preferred locality query parameter is associated with a priority value indicating the relative priority, for the service consumer, of each location description among the plurality of location descriptions.
13. The apparatus according to statement 11 or statement 12, wherein the apparatus comprises: means for receiving, from a service producer, a request for a registration for a profile of the service producer, the profile comprising a locality attribute, wherein the locality attribute defines a plurality of location descriptions of the service producer.
14. The apparatus according to any of statements 11 to 13, wherein each of the plurality of location descriptions of the preferred locality query parameter have an associated type of location description.
15. The apparatus according to any of statements 11 to 14, wherein each of the plurality of location descriptions of the preferred locality query parameter have at least one of: an associated location level and a granularity level.
16. The apparatus according to any of statements 11 to 15, wherein two or more of the plurality of location descriptions of the preferred locality query parameter are associated with different types of location description.
17. The apparatus according to any of statements 11 to 16, wherein an ordering of the plurality of location descriptions within the preferred locality query parameter indicates a priority level for each of the location descriptions.
18. The apparatus according to any of statements 11 to 17, wherein the preferred locality query parameter is configured as a map of key-value pairs, wherein, for each key-value pair:
    the key indicates a priority value, and
    the value indicates at least one type of location description and a related location description value.
19. The apparatus according to any of statements 11 to 18, wherein each of the plurality of location descriptions within the preferred locality query parameter is associated with an abstract indicator, which enables a correlation of each location description registered in network function profiles with location descriptions provided in the discovery request with the same abstract indicator.
20. The apparatus according to any of statements 1 to 19, wherein the means for determining one or more service producers comprises:
    means for, for service producers matching at least one location description of the preferred locality query parameter of the discovery request, determining a service producer matching a location description with a highest priority level in the discovery request, and subsequently, determining a service producer matching a location description with a next priority level in the discovery request 21. The apparatus according to any of statements 11 to 20, wherein the network repository function determines that a service producer matches one location description of the preferred locality query parameter when the locality parameter registered in the profile of that service producer contains at least one location description matching said one location description of the preferred locality query parameter.

22. The apparatus according to any of statements 11 to 21, wherein one location description matches said one location description of the preferred locality query parameter when they have the same type of location, or abstract indicator value, and the same location description value.

23. The apparatus according to any of statements 11 to 22, wherein the apparatus comprises:
means for assigning a priority value for each candidate service producer provided to the service consumer in the response, based on the priority associated with the matching location description of the preferred locality query parameter.

24. The apparatus according to statement 14, wherein the apparatus comprises:
means for replacing the type of location description of each of the plurality of location descriptions with other values determined by an operator.

25. The apparatus according to statement 14, wherein the apparatus comprises:
means for replacing the type of location description of each of the plurality of location descriptions with abstract levels of location granularity.

26. An apparatus for a service producer, the apparatus comprising:
means for providing, to a network repository function, a registration for a profile of the service producer, the profile comprising a locality attribute, wherein the locality attribute defines a plurality of location descriptions of the service producer.

27. The apparatus according to statement 26, wherein each of the plurality of location descriptions of the service producer have a different associated type of location description.

28. The apparatus according to statement 26 or statement 27, wherein the locality attribute is configured as a map of key-value pairs, wherein, for each key-value pair, the key indicates a type of location description, and the value indicates a location description value.

29. The apparatus according to statement 26 or statement 27, wherein the locality attribute is configured as a map of key-value pairs, wherein, for each key-value pair, the key indicates an abstract indicator value, and the value indicates a location description value.

30. The apparatus according to any of statements 26 to 29, wherein the apparatus comprises:
means for receiving, from the network repository function, a response message indicating a successful registration of the profile of the service producer at the network repository function.

31. The apparatus according to any of statements 3, 14, and 27, wherein the type of location indicates at least one of: data center, state, canton, region, province, county, district, city.

32. A method for a service consumer, the method comprising:
providing, to a network repository function, a discovery request comprising a preferred locality query parameter, wherein the preferred locality query parameter comprises a plurality of location descriptions; and
receiving, from the network repository function, a response to the discovery request, wherein the response comprises one or more service producers that match the preferred locality query parameter.

33. The method according to statement 32, wherein each of the plurality of location descriptions is associated with a priority value indicating the relative priority, for the service consumer, of each location description among the plurality of location descriptions.

34. The method according to statement 32 or statement 33, wherein each of the plurality of location descriptions have an associated type of location description.

35. The method according to statement 32 or statement 33, wherein each of the plurality of location descriptions have at least one of: an associated location level, and a granularity level.

36. The method according to statement 34, wherein two or more of the plurality of location descriptions are associated with different types of location description.

37. The method according to any of statements 32 to 36, wherein an ordering of the plurality of location descriptions within the preferred locality query parameter indicates a priority level for each of the location descriptions.

38. The method according to any of statements 32 to 37, wherein the preferred locality query parameter is configured as a map of key-value pairs, wherein, for each key-value pair, the key indicates a priority value and the value indicates one or more types of location description and the related location description value.

39. The method according to any of statements 32 to 38, wherein the method comprises:
in response to receiving the response, communicating with the one or more service producers.

40. The method according to statement 37 or statement 38, wherein the method comprises:
in response to receiving the response, using the received one or more service producers that match the preferred locality query parameter and the associated priority of each of the plurality of location descriptions to prioritise a service producer of the one or more service producers, to communicate with.

41. The method according to any of statements 32 to 40, wherein each of the plurality of location descriptions within the preferred locality query parameter is associated with an abstract indicator, which enables a correlation of each location description registered in network function profiles with location descriptions provided in the discovery request with the same abstract indicator.

42. A method for a network repository function, the method comprising:
receiving, from a service consumer, a discovery request comprising a preferred locality query parameter, wherein the preferred locality query parameter comprises a plurality of location descriptions;
determining one or more service producers for the service consumer using the plurality of location descriptions comprised within the received discovery request; and
providing, to the service consumer, a response to the discovery request, wherein the response comprises one or more service producers that match the preferred locality query parameter.
43. The method according to statement 42, wherein each of the plurality of location descriptions of the preferred locality query parameter is associated with a priority value indicating the relative priority, for the service consumer, of each location description among the plurality of location descriptions.
44. The method according to statement 42 or statement 43, wherein the method comprises:
receiving, from a service producer, a request for a registration for a profile of the service producer, the profile comprising a locality attribute, wherein the locality attribute defines a plurality of location descriptions of the service producer.
45. The method according to any of statements 42 to 44, wherein each of the plurality of location descriptions of the preferred locality query parameter have an associated type of location description.
46. The method according to any of statements 42 to 45, wherein each of the plurality of location descriptions of the preferred locality query parameter have at least one of: an associated location level and a granularity level.
47. The method according to any of statements 42 to 46, wherein two or more of the plurality of location descriptions of the preferred locality query parameter are associated with different types of location description
48. The method according to any of statements 42 to 47, wherein an ordering of the plurality of location descriptions within the preferred locality query parameter indicates a priority level for each of the location descriptions.
49. The method according to any of statements 42 to 48, wherein the preferred locality query parameter is configured as a map of key-value pairs, wherein, for each key-value pair, the key indicates a type of location description, and the value indicates a location description value.
50. The method according to any of statements 42 to 49, wherein each of the plurality of location descriptions within the preferred locality query parameter is associated with an abstract indicator, which enables a correlation of each location description registered in network function profiles with location descriptions provided in the discovery request with the same abstract indicator.
51. The method according to any of statements 42 to 50, wherein the determining one or more service producers comprises:
for service producers matching at least one location description of the preferred locality query parameter of the discovery request, determining a service producer matching a location description with a highest priority level in the discovery request, and subsequently, determining a service producer matching a location description with a next priority level in the discovery request
52. The method according to any of statements 42 to 51, wherein the network repository function determines that a service producer matches one location description of the preferred locality query parameter when the locality parameter registered in the profile of that service producer contains at least one location description matching said one location description of the preferred locality query parameter.
53. The method according to any of statements 42 to 52, wherein one location description matches said one location description of the preferred locality query parameter when they have the same type of location, or abstract indicator value, and the same location description value.
54. The method according to any of statements 42 to 53, wherein the method comprises:
assigning a priority value for each candidate service producer provided to the service consumer in the response, based on the priority associated with the matching location description of the preferred locality query parameter.
55. The method according to statement 45, wherein the method comprises:
replacing the type of location description of each of the plurality of location descriptions with other values determined by an operator.
56. The method according to statement 45, wherein the method comprises:
replacing the type of location description of each of the plurality of location descriptions with abstract levels of location granularity.
57. A method for a service producer, the method comprising:
providing, to a network repository function, a registration for a profile of the service producer, the profile comprising a locality attribute, wherein the locality attribute defines a plurality of location descriptions of the service producer.
58. The method according to statement 57, wherein each of the plurality of location descriptions of the service producer have a different associated type of location description.
59. The method according to statement 57 or statement 58, wherein the locality attribute is configured as a map of key-value pairs, wherein, for each key-value pair, the key indicates a type of location description, and the value indicates a location description value.
60. The method according to statement 57 or statement 58, wherein the locality attribute is configured as a map of key-value pairs, wherein, for each key-value pair, the key indicates an abstract indicator value, and the value indicates a location description value.
61. The method according to any of statements 57 to 60, wherein the method comprises:
receiving, from the network repository function, a response message indicating a successful registration of the profile of the service producer at the network repository function.
62. The method according to any of statements 35, 45, and 58, wherein the type of location indicates at least one of: data center, state, canton, region, province, county, district, city.
63. An apparatus comprising: at least one processor, and at least one memory storing instructions that, when executed by the one or more processors, cause the apparatus to perform the method of any of statements 32 to 41.
64. An apparatus comprising: at least one processor, and at least one memory storing instructions that, when executed by the one or more processors, cause the apparatus to perform the method of any of statements 42 to 56.
65. An apparatus comprising: at least one processor, and at least one memory storing instructions that, when executed by the one or more processors, cause the apparatus to perform the method of any of statements 57 to 62.
66. A computer program comprising instructions, which when executed by an apparatus, cause the apparatus to perform the method of any of statements 32 to 41.
67. A computer program comprising instructions, which when executed by an apparatus, cause the apparatus to perform the method of any of statements 42 to 56.
68. A computer program comprising instructions, which when executed by an apparatus, cause the apparatus to perform the method of any of statements 57 to 62.
69. A non-transitory computer readable medium comprising program instructions that, when executed by an apparatus, cause the apparatus to perform the method of any of statements 32 to 41.
70. A non-transitory computer readable medium comprising program instructions that, when executed by an apparatus, cause the apparatus to perform the method of any of statements 42 to 56.
71. A non-transitory computer readable medium comprising program instructions that, when executed by an apparatus, cause the apparatus to perform the method of any of statements 57 to 62.
72. The apparatus according to statement 1, wherein the apparatus is for a service consumer, or the apparatus is comprised within the service consumer, or the apparatus is the service consumer.
73. The apparatus according to statement 11, wherein the apparatus is for a network repository function, or the apparatus is comprised within the network repository function, or the apparatus is the network repository function.
74. The apparatus according to statement 26, wherein the apparatus is for a service producer, or the apparatus is comprised within the service producer, or the apparatus is the service producer.

The invention claimed is:

1. An apparatus comprising
at least one processor, and
at least one memory storing instructions that, when executed by the one or more processors, cause the apparatus to:
provide, to a network repository function, a discovery request comprising a preferred locality query parameter, wherein the preferred locality query parameter comprises a plurality of location descriptions; and
receive, from the network repository function, a response to the discovery request, wherein the response comprises one or more service producers that match the preferred locality query parameter,
wherein the preferred locality query parameter is configured as a map of key-value pairs,
wherein, for each key-value pair:
the key indicates a priority value, and
the value indicates at least one type of location description and a related location description value.

2. The apparatus according to claim 1,
wherein each of the plurality of location descriptions is associated with a priority value indicating the relative priority, for the service consumer, of each location description among the plurality of location descriptions.

3. The apparatus according to claim 1,
wherein each of the plurality of location descriptions have at least one of: an associated location level, and a granularity level.

4. The apparatus according to claim 1,
wherein an ordering of the plurality of location descriptions within the preferred locality query parameter indicates a priority level for each of the location descriptions.

5. The apparatus according to claim 1, wherein the memory stores instructions that, when executed by the one or more processors, further cause the apparatus to:
in response to receiving the response, communicate with the one or more service producers.

6. The apparatus according to claim 1,
wherein each of the plurality of location descriptions have an associated type of location description.

7. The apparatus according to claim 6,
wherein two or more of the plurality of location descriptions are associated with different types of location description.

8. The apparatus according to claim 7, wherein the memory stores instructions that, when executed by the one or more processors, further cause the apparatus to:
in response to receiving the response, use the received one or more service producers that match the preferred locality query parameter and the associated priority of each of the plurality of location descriptions to prioritise a service producer of the one or more service producers, to communicate with.

9. An apparatus comprising
at least one processor, and
at least one memory storing instructions that, when executed by the one or more processors, cause the apparatus to:
receive, from a service consumer, a discovery request comprising a preferred locality query parameter, wherein the preferred locality query parameter comprises a plurality of location descriptions;
determine one or more service producers for the service consumer using the plurality of location descriptions comprised within the received discovery request; and
provide, to the service consumer, a response to the discovery request, wherein the response comprises one or more service producers that match the preferred locality query parameter,
wherein the preferred locality query parameter is configured as a map of key-value pairs,
wherein, for each key-value pair:
the key indicates a priority value, and
the value indicates at least one type of location description and a related location description value.

10. The apparatus according to claim 9,
wherein each of the plurality of location descriptions of the preferred locality query parameter is associated with a priority value indicating the relative priority, for the service consumer, of each location description among the plurality of location descriptions.

11. The apparatus according to claim 10, wherein the memory stores instructions that, when executed by the one or more processors, further cause the apparatus to:
determine that a service producer matches one location description of the preferred locality query parameter when the locality parameter registered in the profile of that service producer contains at least one location description matching said one location description of the preferred locality query parameter.

12. The apparatus according to claim 9, wherein the memory stores instructions that, when executed by the one or more processors, further cause the apparatus to:

receive, from a service producer, a request for a registration for a profile of the service producer, the profile comprising a locality attribute, wherein the locality attribute defines a plurality of location descriptions of the service producer.

13. The apparatus according to claim 9,
wherein each of the plurality of location descriptions have an associated type of location description.

14. The apparatus according to claim 9,
wherein each of the plurality of location descriptions of the preferred locality query parameter have at least one of: an associated location level and a granularity level.

15. The apparatus according to claim 9,
wherein an ordering of the plurality of location descriptions within the preferred locality query parameter indicates a priority level for each of the location descriptions.

16. An apparatus comprising
at least one processor, and
at least one memory storing instructions that, when executed by the one or more processors, cause the apparatus to:
provide, to a network repository function, a registration for a profile of a service producer, the profile comprising a locality attribute,
wherein the locality attribute defines a plurality of location descriptions of the service producer,
wherein the locality attribute is configured as a map of key-value pairs,
wherein, for each key-value pair,
the key indicates a type of location description, and
the value indicates a location description value.

17. The apparatus according to claim 16,
wherein each of the plurality of location descriptions of the service producer have a different associated type of location description.

18. The apparatus according to claim 16,
wherein each of the plurality of location descriptions have an associated type of location description.

\* \* \* \* \*